United States Patent [19]

Lew

[11] Patent Number: 4,882,935
[45] Date of Patent: Nov. 28, 1989

[54] CONVECTIVE ATTENUATION FLOWMETER

[76] Inventor: Hyok S. Lew, 7890 Oak St., Arvada, Colo. 80005

[21] Appl. No.: 215,033

[22] Filed: Jul. 5, 1988

Related U.S. Application Data

[63] Continuation-in-part of Ser. No. 71,777, Jul. 10, 1987, and a continuation-in-part of Ser. No. 163,855, Mar. 3, 1988.

[51] Int. Cl.$^4$ .............................................. G01F 1/84
[52] U.S. Cl. .................................................. 73/861.38
[58] Field of Search ........................ 73/861.37, 861.38

[56] References Cited

U.S. PATENT DOCUMENTS

4,660,421 4/1987 Dahlin et al. ..................... 73/861.38

Primary Examiner—Herbert Goldstein

[57] ABSTRACT

A mass flowmeter comprises a first vibrating conduit (74) and second vibrating conduit (75) connected in parallel, which combination is connected in series to a third vibrating conduit (73). The mass flow rate is determined by evaluating damping of the third conduit and at least one of the pair of parallel conduits.

18 Claims, 4 Drawing Sheets

CONVECTIVE ATTENUATION FLOWMETER

This is a continuation-in-part application to Ser. No. 07/071,777 filed on July 10, 1987 and Ser. No. 07/163,855 filed on Mar. 3, 1988.

The flowmeter of the present invention determines mass flow rate of the fluid moving through a flowmeter conduit by measuring the attenuation of the flexural vibrations of the flowmeter conduit imposed by an electromagnetic vibrator in an intermittent or continuous mode. The attenuation of the imposed flexural vibrations of the flowmeter conduit is caused by two different mechanisms. Firstly, the fluid moving through the vibrating conduit absorbs the kinetic energy of the flexural vibrations from the vibrating conduit and carries away the absorbed kinetic energy, which form of energy loss by the vibrating conduit (convective energy loss) attenuates the flexural vibrations of the vibrating conduit (convective attenutation). Secondly, the vibrating conduit also loses its kinetic energy due to the friction in the fluid, ambient air and the solid structures of the vibrating system (viscous energy loss) and, consequently, the flexural vibrations of the vibrating conduit experience another form of attenutation (viscous attenuation). By subtracting the viscous attenuation, that is generally equal to the attenuation of the flexural vibrations of the vibrating conduit containing the fluid under zero net flow condition, from the total attenuation, the convective attenuation is determined and the mass flow rate of the fluid is determined therefrom, as the exponent of the convective attenuation is proportional to the mass flow rate.

The priority of the present invention is based on the U.S. patent applications Ser. No. 07/071,777 entitled "Convective attenuation flowmeter" filed on July 10, 1987 and Ser. No. 07/163,855 entitled "Convective attenuation flowmeter" filed on Mar. 3, 1988.

The fluid moving through a vibrating conduit alters the natural mode of the flexural vibrations in two different ways. Firstly, the inertia force of the moving fluid (convective inertia force) shifts the phase of the flexural vibrations, which principles have been employed in the mass flow measurement under the name of "Coriolis force flowmeter" or "Convective inertia force flowmeter", the latter of which names this inventor has designated to a Coriolis force flowmeter invented by him. Secondly, the moving fluid takes away the kinetic energy of the flexural vibrations from the vibrating conduit as described by the preceding paragraphs (convective attenuation). At the present time, a mass flowmeter employing the principles of the convective attenuation has not been practiced.

The primary object of the present invention is to provide a mass flowmeter operating on the principles of convective attenuation.

Another object is to provide a convective attenuation flowmeter comprising a single vibrating conduit, wherein the convective attenuation is determined by substracting the viscous attenuation empirically determined and stored in the data processor memory from the total attenuation measured by the vibration analyzer.

A further object is to provide a convective attenuation flowmeter comprising a pair of parallel vibrating conduits wherein one of the two parallel vibrating conduits has zero net flow of the fluid and the convective attenuation is determined as the difference in the attenuation between the flexural vibrations of the two parallel vibrating conduits.

Yet another object is to provide a convective attenuation flowmeter, comprising two vibrating conduits disposed in series arrangement, wherein the convective attenuation is determined from a combination of the attenuations of the flexural vibrations of the two vibrating conduits.

Yet a further object is to provide a convective attenuation flowmeter comprising a pair of parallel vibrating conduits connected to a third vibrating conduit is series arrangement, wherein the convective attenuation is determined from a combination of the attenuations of the flexural vibrations of at least one of the pair of parallel vibrating conduits and the third vibrating conduit.

These and other objects of the present invention will become clear as the description thereof progresses. The present invention may be described with a great clarity and specificity by referring to the following figures:

Figure 1:
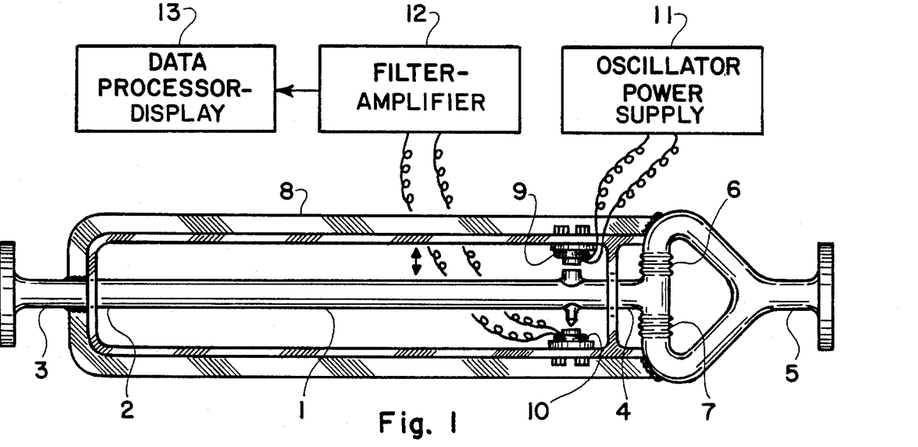
FIG. 1 illustrates an embodiment of the convective attenuation flowmeter employing a single vibrating conduit.

In FIG. 1 there is illustrated a fundamental embodiment of the convective attenuation flowmeter, which embodiment comprises a vibrating conduit 1 with one extremity 2 fixedly connected to a first port leg 3 and the other extremity 4 connected to a Y-shaped second port leg 5 in a laterally flexible arrangement by a T-shaped coupling including a pair of flexible bellow couplings 6 and 7. The extremity 2 of the vibrating conduit 1 and the Y-shaped port leg 5 are rigidly anchored to a rigid frame 8. The vibrating means or electromagnetic vibrator 9 affixed to the frame 8 generates flexural vibrations of the vibrating conduit 1, wherein the amplitude of the flexural vibrations increases from the fixed extremity 2 to the flexible extremity 4. The motion detector 10 affixed to the frame 8 detects the flexural vibrations of the vibrating conduit 1, which motion detector may be an acceleration detector affixed to the vibrating conduit 1 instead of a velocity or position detector secured to the frame 8. The vibrator power supply 11 provides electric currents energizing the electromagnetic vibrator 9 in the form of pulses or continuous alternating currents, which intermittently induces or continuously excites the flexural vibrations. The electromotive forces from the motion detector 10 generated by the flexural vibrations are conditioned by a filter-amplifier 12 and process by a data processor 13 that provides information related to the mass flow rate of media moving through the vibrating conduit 1. The combination of the vibrating conduit 1, electromagnetic vibrator 9 and the motion detector 10 may be sealed within an evacuated container as described in conjunction with FIG. 4.

The media entering the fixed extremity 2 of the vibrating conduit 1 has zero flexural velocity, and gains flexural velocity as it travels towards the flexible extremity 4, and leaves the vibrating conduit 1 with a flexural velocity v, where v is the representative value of the flexural velocity of the vibrating conduit 1. As a consequence, the media moving through the vibrating conduit 1 takes away the kinetic energy from the vibrating conduit at a time rate proportional at $\frac{1}{2}\rho v^2 U$, where $\rho$ is the density of the media and U is the convective velocity of the media moving through the vibrating conduit 1. The vibrating conduit 1 loses its kinetic energy due to the friction in the system at a time rate proportional to $\mu v^2$, where $\mu$ represents total viscosity of the vibrating system which includes the viscosity of the media moving through the vibrating conduit 1 and that of the ambient air as well as the viscosity representing the friction of the solid members in the vibrating system. A differential equation representing the balance of the kinetic energy readily provides a solution of the following form:

$$v = v_0 \exp.[-(K_1 + K_2 \rho UA)t], \qquad (1)$$

where $v_0$ is the initial value of the v, $K_1$ and $K_2$ are constant parameters which are to be determined empirically, A is the cross section of the flow passage in the vibrating conduit, and t is the time, If the direction of the flow is reversed, the attenuation of the flexural vibrations is given by equation $$v = v_0 \exp.[-(K_1 K_3 \rho UA)t], \qquad (2)$$

where $K_3$ is a constant parameter having numerical value different from that of $K_2$ appearing in the equation (1), because the time rate of convective transportation of the kinetic energy of the flexural vibration changes in magnitude depending on the direction of the media flow.

Figure 2:
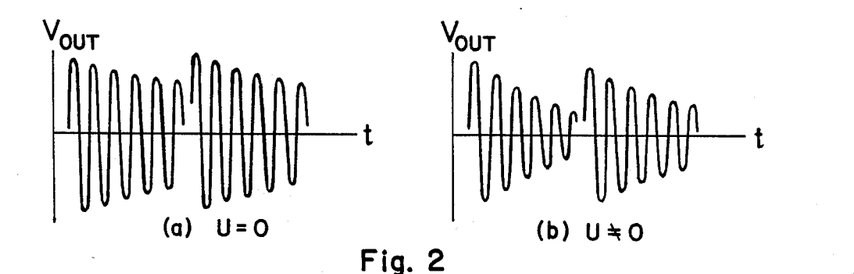
FIG. 2 illustrates typical attenuation patterns of the flexural vibrations of the vibrating conduit containing stationary fluid or fluid under zero net flow and moving fluid therein.

The attenuation pattern of the intermittently induced flexural vibration of the vibrating conduit 1 containing stationary media of zero velocity is illustrated in FIG. 2-(a), while FIG. 2-(b) illustrates the attenuation pattern thereof containing moving media at velocity U. It is readily recognized that $K_1$ in equations (1) or (2) can be determined empirically from the attenuation of flexural vibrations of the vibrating conduit containing stationary media or media under zero net flow, while $K_2$ or $K_3$ is determined empirically. Once those empirically determined values of $K_1$ and $K_2$ or $K_3$ are substituted into equation (1) or (2), the mass flow rate $\rho UA$ is readily determined by analyzing the measured attenuation of the flexural vibrations in comparison with equation (1) or (2).

The time rate of loss of the kinetic energy $E_{OUT}$ from the continuously excited flexural vibrations of the vibrating conduit can be written in the form:

$$\dot{E}_{OUT} = (A_1 \tfrac{1}{2}\rho UA + A_2 \mu)v^2, \qquad (3)$$

where $A_1$ are $A_2$ are constant parameters. The electromotive force $V_{OUT}$ from the motion detector 10 is proportional to the flexural velocity v and, consequently, the equation (3) can be written in the form $$\dot{E}_{OUT} = (B_1 \tfrac{1}{2}\rho UA + B_2\mu)(V_{OUT})^2, \quad (4)$$

where $B_1$ and $B_2$ are constant parameters. The time rate of supply of electrical energy to the vibrating conduit 1 by the electromagnetic vibrator 9 can be expressed in the form $$\dot{E}_{IN} = B_3(V_{IN})^2, \quad (5)$$

where $B_3$ is a constant parameter and $V_{IN}$ is the peak value of the alternating electromotive force consumed by the electromagnetic vibrator. The rate of energy loss given by the equation (4) has to be equal to the rate of energy supply given by the equation (5), which yields the following equation for the mass flow rate $$\rho UA = C_1 \left(\frac{V_{IN}}{V_{OUT}}\right)^2 - C_2 M, \quad (6)$$

where $C_1$ and $C_2$ are constant parameters. The equation (6) can be written in the form $$\rho UA = C_1 \left[ \left(\frac{V_{IN}}{V_{OUT}}\right)^2 - \left(\frac{V_{IN}}{V_{OUT}}\right)^2_{U=0} \right], \quad (7)$$

where the subscript $U=0$ stands for the value corresponding to the stationary media or media under zero net flow. For the media moving through the vibrating conduit in the opposite direction, the equation (7) can be written in the form $$\rho UA = C_3 \left[ \left(\frac{V_{IN}}{V_{OUT}}\right)^2 - \frac{V_{IN}}{V_{OUT}}\right)^2_{U=0} \right], \quad (8)$$

where $C_3$ is another constant parameter having numerical value different from that of $C_2$ appearing in the equation (7). Once the consant parameters $C_1$ or $C_3$ are empirically determined, the mass flow rate can be determined from the measured values of $V_{IN}$ and $V_{OUT}$ by using equation (7) or (8).

Figure 3:
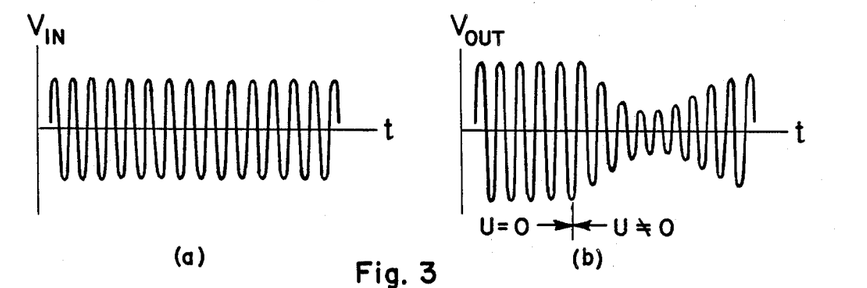
FIG. 3 illustrates typical dissipation of the flexural vibrations of the vibrating conduit containing stationary fluid or fluid under zero net flow and moving fluid therein.

The input emf of a constant amplitude supplied to the electromagnetic vibrator 9 in the form of continuous alternating currents is illustrated in FIG. 3-(a). The output emf from the motion detector 10 that varies as a function of the mass flow rate is illustrated in FIG. 3-(b). The mass flow is determined by substituting the measured values of $V_{IN}$ and $V_{OUT}$ into the equation (7) or (8).

Figure 4:
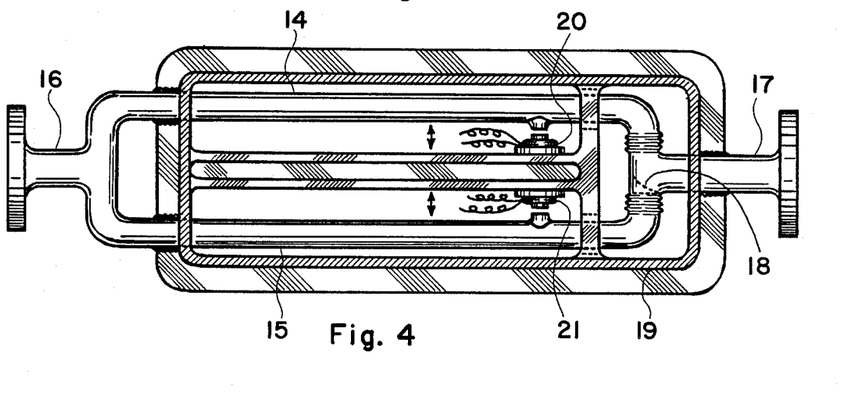
FIG. 4 illustrates an embodiment of the convective attenuation flowmeter comprising two parallel vibrating conduits arranged in a symmetric relationship.

In FIG. 4 there is illustrated an embodiment of the convective attenuation flowmeter that includes means for determining the viscous attenuation or viscous damping on a real time basis, whereby the convective attenuation or convective dissipation of the flexural vibrations is determined accurately independent to the change in the fluid viscosity and friction associated with solid members in the flexural vibrating system. The convective attenuation flowmeter comprises a pair of dynamically identical vibrating conduits 14 and 15 disposed in parallel arrangement, wherein each of the two vibrating conduits has the same construction as the vibrating conduit 1 described in conjunction with FIG. 1. The pair of parallel vibrating conduits 14 and 15 are connected to a first port leg 16 in a fixed arrangement at the first extremity and to a second port leg 17 in a laterally flexible arrangement at the second extremity. The first vibrating conduit 14 provides a flow passage connecting the two port legs 16 and 17 to one another, while the second vibrating conduit 15 is blocked by a plug 18 at the extremity coupled to the port leg 17 by a flexible coupling. The electromagnetic vibrator and motion detector are integrated into a dual function vibratordetector 20 and 21. The combination comprising the two parallel vibrating conduits 14 and 15, and the vibrator-sensor 20 and 21 may be sealed within an evacuated container 19. The flexural vibration of the first vibrating conduit 14 containing moving media provides information on the total attenuation or dissipation resulting from the convective and viscous energy dessipation, while that of the second vibrating conduit 15 containing stationary media provides information on the viscous energy dessipation, while that of the second vibrating conduit 15 containing stationary media provides information on the viscous attenuation or dissipation resulting from the viscous energy dissipation. The net convective attenuation or convective dissipation is determined by combining the attenuation data of the two vibrating conduits 14 and 15. The mass flow rate is determined from the net convective attenuation of the intermittently imposed flexural vibrations per equation (1) or (2), or from the net convective dissipation of the continuously excited flexural vibrations per equation (7) or (8).

Figures 5, 6, 7, 8, 9:
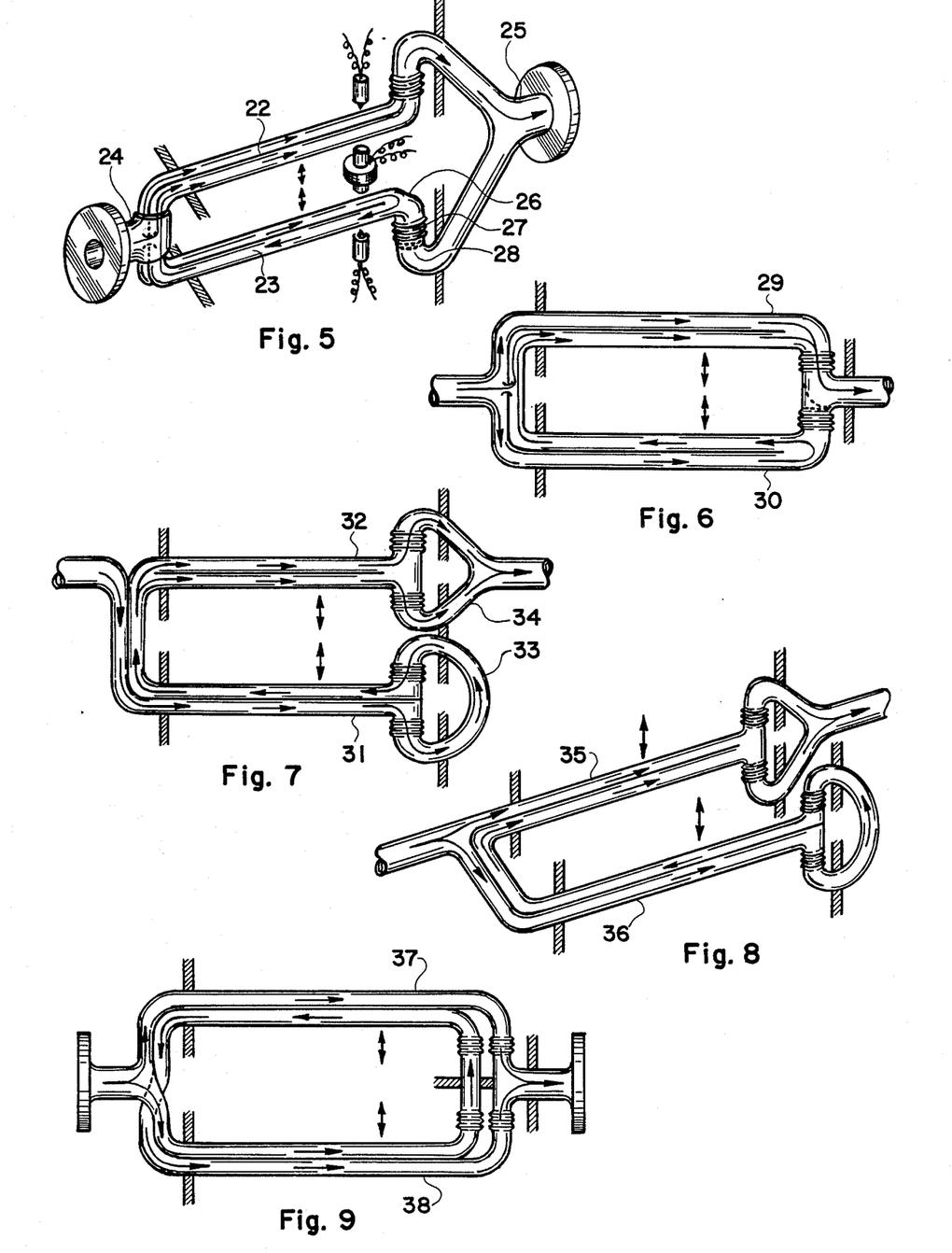
FIG. 5 illustrates an embodiment of the convective attenuation flowmeter comprising two parallel vibrating conduits arranged in a symmetric relationship, wherein one of the two parallel vibrating conduits has zero net flow.
FIG. 6 illustrates another embodiment of the convective attenuation flowmeter comprising two parallel vibrating conduits arranged in a symmetric relationship, wherein one of the two parallel vibrating conduits has zero net flow.
FIG. 7 illustrates a further embodiment of the convective attenuation flowmeter comprising two parallel vibrating conduits arranged in a symmetric relationship, wherein one of the two vibrating conduits has zero net flow.
FIG. 8 illustrates yet another embodiment of the convective attenuation flowmeter comprising two parallel vibrating conduits arranged in a symmetric relationship, wherein one of the two parallel vibrating conduits has zero net flow.
FIG. 9 illustrates yet a further embodiment of the convective attenuation flowmeter comprising two parallel vibrating conduits arranged in a symmetric relationship, wherein one of the two parallel vibrating conduits has zero net flow.

In FIG. 5 there is illustrated an embodiment of the convective attenuation flowmeter comprising a pair of parallel vibrating legs 22 and 23 having identical flexural vibration characteristics disposed in a symmetric arrangement about a plane therebetween, wherein each of the two vibrating legs includes two separate and parallel conduits disposed on a plane generally perpendicular to the plane including the two vibrating legs 22 and 23 and affixed to one another. Both conduits included in the second vibrating leg 22 provide flow passages connecting the two port legs 24 and 25 to one another, while the two conduits included in the second vibrating leg 23 are open to one port leg 24 only as the other extremity 25 connected to the second port leg 25 is blocked by a plug 28. The two conduits included in the second vibrating leg 23 are open to one another at the blocked extremity 26 and, consequently, the media circulating through the second vibrating leg 23 always has a zero net flow. While this embodiment of the convective attenuation flowmeter operates on the same principles as that shown in FIG. 4, it provides an advantage in view that the circulation of the media through the second vibrating leg 23 prevents the accumulation of the stale media and, consequently, the density and viscosity of the media contained in the two vibrating legs 22 and 23 are more closely matched on real time basis.

In FIG. 6 there is illustrated another embodiment of the convective attenuation flowmeter comprising a pair of parallel vibrating legs 29 and 30. which has essentially the same construction as that shown in FIG. 5 with one exception. In this embodiment, each of the two vibrating legs 29 and 30 includes a pair of conduits disposed on a plane including the two vibrating legs 29 and 30. For the brevity of illustration, the vibrator and the motion sensor are not shown in this illustration.

In FIG. 7 there is illustrated a further embodiment of the convective attenuation flowmeter comprising a pair of parallel vabrating legs 31 and 32 having identical flexural vibration characteristics. The media entering the flowmeter flow through the first conduit included in the first vibrating leg 31 and doubles back through the second conduit included in the first vibrating leg 31 after flowing through a 180 degree turn loop 33. The media entering the second vibrating leg 32 flows through both of the two conduits included in the second vibrating legs 32 and exits through the Y-shaped port leg 34. According to the equations (1) and (2), the attenuation of the flexural vibrations of the two vibrating legs 31 and 32 are respectively given by equations $$v_1 = v_{10} \exp\left[-\left(K_1 + \frac{K_2 - K_3}{.2}\rho UA\right)t\right], \text{ and}$$

$$v_2 = v_{20} \exp.[-(K_1 + K_2 \rho UA)t].$$

Once the constant parameters $K_2$ and $K_3$ are determined empirically, the constant parameter $K_1$ is eliminated between the aforementioned two equations and the mass flow rate is determined therefrom. If $K_2$ is equal to $K_3$, the operating principles of the convective attenuation flowmeter shown in FIG. 7 reduces to those of the embodiment shown in FIGS. 4, 5 and 6.

In FIG. 8 there is illustrated yet another embodiment of the convective attenuation flowmeter comprising a pair of parallel vibrating legs 35 and 36 having identical flexural vibration characteristics, each of which includes a pair of conduits, wherein the vibrating leg 36 has zero net mass flow. This convective attenuation flowmeter operates on the same principles as those described in conjunction with FIG. 4.

In FIG. 9 there is illustrated yet a further embodiment of the convective attenuation flowmeter comprising a pair of vibrating legs 37 and 38, each of which includes a pair of conduits, wherein the vibrating legs 37 has zero net flow. This convective attenuation flowmeter operates on the same principles as those described in conjunction with FIG. 4.

Figure 10:
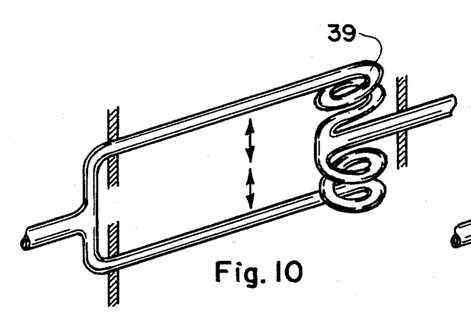
FIG. 10 illustrates still another embodiment of the convective attenuation flowmeter comprisng two parallel vibrating conduits arranged in a symmetric relationship.
Figure 11:
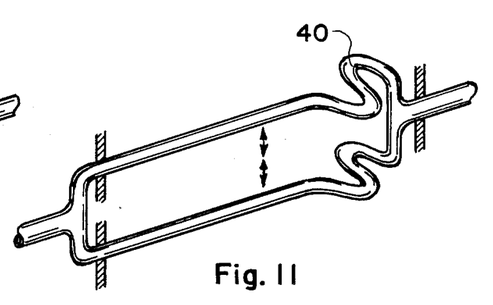
FIG. 11 illustrates still a further embodimentof the convective attenuation flowmeter comprising two parallel vibrating conduits arranged in a symmetric relationship.
Figure 12:
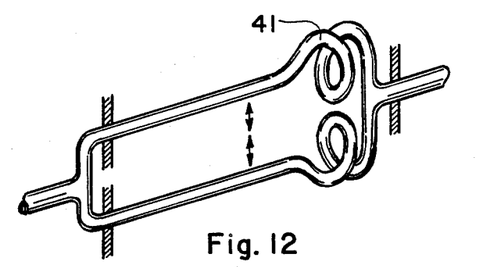
FIG. 12 illustrates yet still another embodiment of the convective attenuation flowmeter comprising two parallel vibrating conduits arranged in a symmetric relationship.

In FIG. 10, 11 and 12, there are illustrated various embodiments of the convective attenuation flowmeter comprising a pair of parallel vibrating legs having identical flexural vibration characteristics, which embodiments employ flexible couplings different from the simple bellow couplings. In the embodiment shown in FIG. 10, one extremity of the vibrating leg coiled into a helical spring 39 provides the laterally flexible coupling connecting one extremity of the vibrating conduit to a port leg. In the embodiment shown in FIG. 11, the S-shaped section 40 included in one extremity of the vibrating leg, that is disposed on a plane perpendicular to the direction of the flexural vibrations, provides the laterally flexible coupling. In the embodiment shown in FIG. 12, the flexural coupling is provided by one extremity of the vibrating conduit formed into a flexible coil spring 41. Each of the pair of vibrating legs included in the convective attenuation flowmeter shown in FIGS. 10, 11 and 12 may include a single conduit and assembled into an embodiment similar to that shown in FIG. 4, or may include double conduits and assembled into an embodiment similar to that shown in FIG. 5, 6, 7, 8 or 9.

Figure 13:
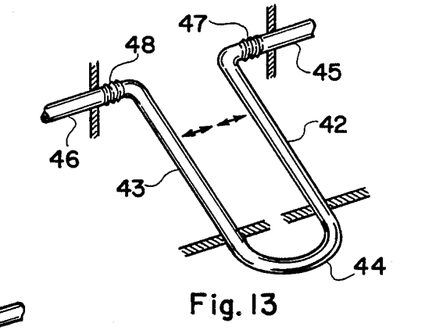
FIG. 13 illustrates an embodiment of the convective attenuation flowmeter comprising two vibrating conduits arranged in series in a symmetric relationship about a plane therebetween.

In FIG. 13 there is illustrated an embodiment of the convective attenuation flowmeter comprising a pair of vibrating conduits 42 and 43 having identical flexural vibration characteristics, which are disposed symmetrically about a plane therebetween and connected to one another in series by a U-shaped conduit section 44, wherein the extremities of the two vibrating conduits 42 and 43 are respectively connected to two port legs 45 and 46 by two flexible couplings 47 and 48, respectively. The attenuation of the intermittently induced flexural vibrations and the dissipation of the continuously excited flexural vibrations of the two vibrating conduits 42 and 43 are respectively given by the equations (1) and (2), and the equations (7) and (8), wherefrom the mass flow rate is determined after eliminating the viscous attenuation between the equations (1) and (2), or by eliminating the viscous dissipation between the equations (7) and (8).

Figures 14, 15:
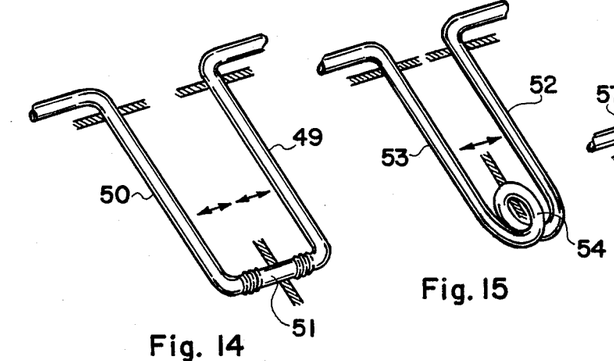
FIG. 14 illustrates another embodiment of the convective attenuation flowmeter comprising two vibrating conduits arranged in series in a symmetric relationship about a plane therebetween.
FIG. 15 illustrates a further embodiment of the convective attenuation flowmeter comprising two vibrating conduits arranged in series in a symmetric relationship about a plane therebetween.

In FIG. 14 there is illustrated another embodiment of the convective attenuation flowmeter comprising a pair of identical vibrating conduits 49 and 50 connected to one another into a symmetric arrangement by a coupling conduit 51 including a pair of flexible couplings at the two extremities thereof, which embodiment operates on the same principles as those described in conjunction with FIG. 13.

In FIG. 15 there is illustrated a further embodiment of the convective attenuation flowmeter comprising a pair of identical vibrating conduits 52 and 53 connected to one another into a symmetric arrangement by a conduit section formed into a coil 54, which embodiment operates on the same principles as those described in conjunction with FIG. 13. It should be mentioned that the flexible coupling employed in the embodiment shown in FIG. 13 may be replaced with a coiled conduit section as shown in FIG. 15.

Figure 16:
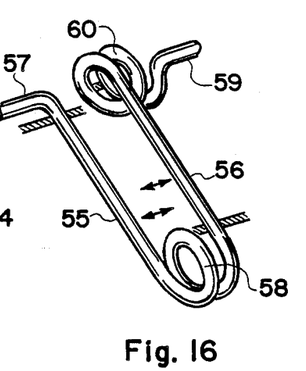
FIG. 16 illustrates an embodiment of the convective attenuation flowmeter comprising two vibrating conduits arranged in series in an asymmetric relationship about a plane therebetween.

In FIG. 16 there is illustrated an embodiment of the convective attenuation flowmeter comprising a pair of identical vibrating conduits 55 and 56 asymmetrically disposed in series, wherein the first port leg 57 is connected to the first vibrating conduit 55, which is connected to the second vibrating conduit 56 by a coil section of the conduit 58, and the second vibrating conduit 56 is connected to the second port leg 59 by another coil section of the conduit 60. In this embodiment, attenuation or dissipation of the flexural vibrations of the two vibrating conduits 55 and 56 differ from one another because the second vibrating conduit 56 picks up a portion of the energy lost by the first vibrating conduit 55. The mass flow rate is determined by combining the attenuations of the intermittently induced flexural vibrations of the two vibrating conduits or the dissipations of the continuously excited flexural vibrations thereof in such a way that the viscosity effect is eliminated therebetween.

Figure 17:
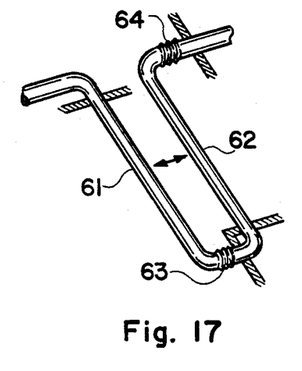
FIG. 17 illustrates another embodiment of the convective attenuation flowmeter comprising two vibrating conduits arranged in series in an asymmetric relationship about a plane therebetween.

In FIG. 17 there is illustrated another embodiment of the convective attenuation flowmeter comprising a pair of identical vibrating conduits 61 and 62 asymmetrically disposed in series, which has essentially the same construction as the embodiment shown in FIG. 16 with one exception that is the use of the flexible bellow couplings 63 and 64 in place of the coil sections of conduit.

Figure 18:
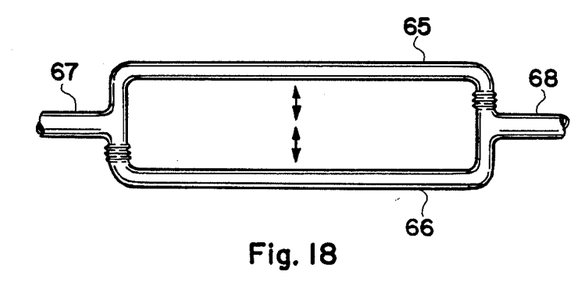
FIG. 18 illustrates an embodiment of the convective attenuation flowmeter comprising two parallel vibrating conduits arranged in an asymmetric relationship about a plane therebetween.

In FIG. 18 there is illustrated an embodiment of the convective attenuation flowmeter comprising a pair of parallel vibrating conduits 65 and 66 having identical flexural vibration characteristics, wherein the first vibrating conduit 65 is connected fixedly to a first port leg 67 at one extremity and flexibly to a second port leg 68 at the other extremity, while the second vibrating conduit 66 is connected flexibly to the first port leg 67 at one extremity and fixedly to the second port leg 68 at the other extremity. The mass flow rate is determined from the equations (1) and (2) or from the equations (7) and (8) after substituting ½U for U appearing therein.

Figures 19, 20, 21, 22:
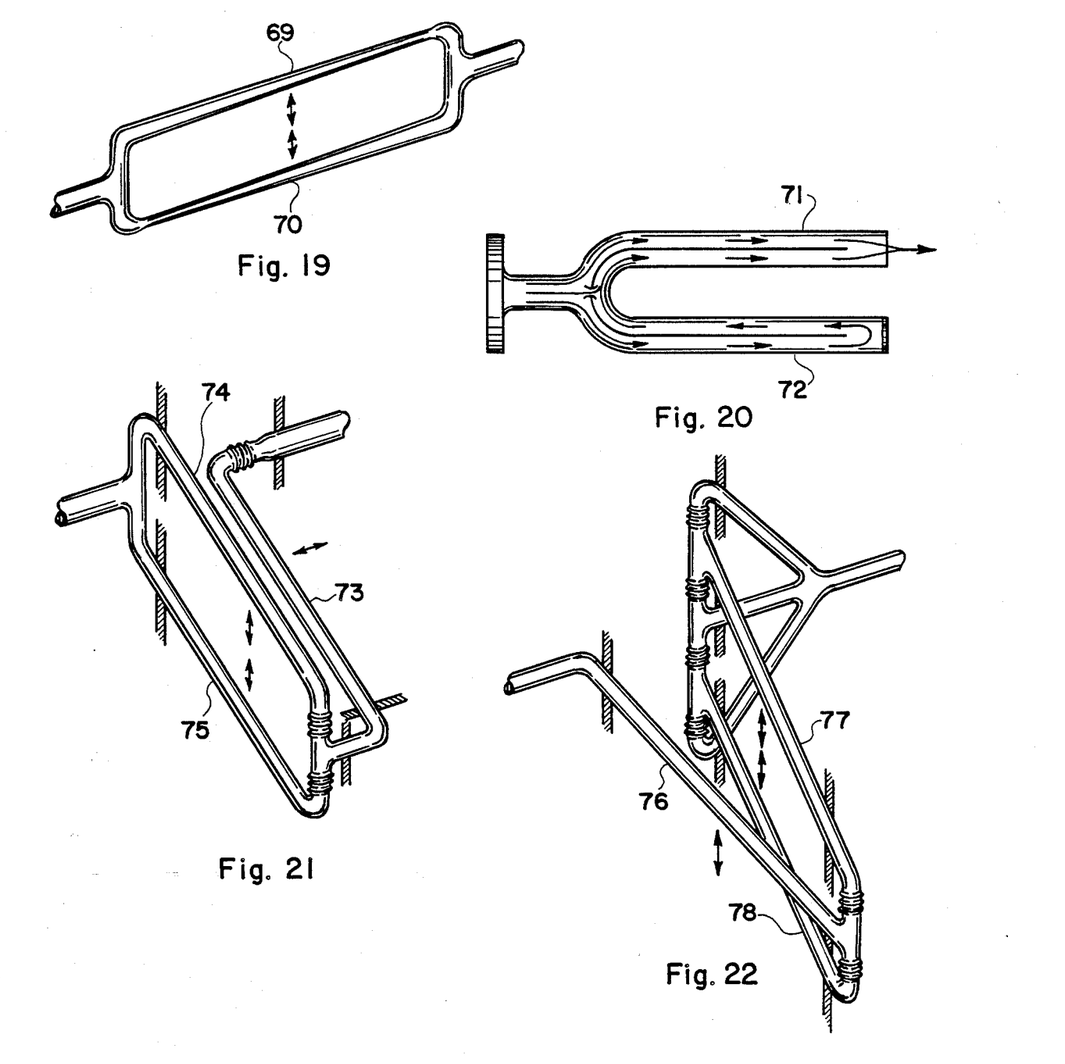
FIG. 19 illustrates another embodiment of the convective attenuation flowmeter comprising two parallel vibrating conduits arranged in an asymmetric relationship about a plane therebetween.
FIG. 20 illustrates a nozzle type convective attenuation flowmeter comprising a pair of parallel vibrating conduits of cantilever arrangement, wherein one of the two parallel vibrating conduits has zero net flow.
FIG. 21 illustrates an embodiment of the convective attenuation flowmeter comprising a pair of parallel vibrating conduits connected to a third vibrating conduit in series.
FIG. 22 illustrates another embodiment of the convective attenuation flowmeter comprising a pair of parallel vibrating conduits connected to a third vibrating conduit in series.

In FIG. 19 there is illustrated another embodiment of the convective attenuation flowmeter comprising a pair of parallel vibrating conduits 69 and 70, which are tapered in two opposite directions. This embodiment operates on the same principles as those described in conjunction with FIG. 18.

In FIG. 20 there is illustrated a nozzle type convective attenuation flowmeter comprising a pair of parallel vibrating legs 71 and 72 disposed in cantilever arrangement, wherein one of the two vibrating legs has zero net flow. In the particular illustrated embodiment, the media is curculated through the vibrating leg having zero net flow. It is readily recognized that a nozzle type convective attenuation flowmeter may comprise a pair of parallel vibrating cantilever conduits wherein one is open and the other has a plugged end as suggested by the embodiment shown in FIG. 4. The nozzle type convective attenuation flowmeter operates on the same principles as those described in conjunction with FIG. 4.

In FIG. 21 there is illustrated an embodiment of the convective attenuation flowmeter comprising a first vibrating conduit 73 connected in series to a pair of parallel vibrating conduits 74 and 75, wherein the three vibrating conduits have identical flexural vibration characteristics. When the equation (1) is applied to the flexural vibrations of the three vibrating conduits and $K_1$ is eliminated between the three equations resulting therefrom, the following equation is obtained:

$$\frac{v_1}{\sqrt{v_2 v_3}} = \frac{v_{10}}{\sqrt{v_{20} v_{30}}} \exp\left(-\frac{1}{2} K_2 \rho U A t\right),$$

where the subscript 1, 2 and 3 respectively stand for the first, second and thrid vibrating conduits 73, 74 and 75. Once $K_2$ determined empirically, the mass flow rate is determined from the measured values of $v_1$, $v_2$ and $v_3$ by using the aforementioned equation. If the media flow bifurcates equally into the two parallel vibrating conduits 74 and 75, $\sqrt{v_2 v_3}$ may be replaced by $v_2$ and $v_3$, and $\sqrt{v_{20} v_{30}}$ by $v_{20}$ or $v_{30}$.

In FIG. 22 there is illustrated another embodiment of the convective attenuation flowmeter comprising a first vibrating conduit 76 connected in series to a pair of parallel vibrating conduits 77 and 78, which embodiment has a construction similar to and operates on the same principles as that of FIG. 21.

While the principles of the present invention have now been made clear by the illustrative embodiments, there will be many obvious modifications of the structures, arrangements, proportions, elements and materials which are particularly adapted to the specific working environments and operating conditions in the practice of the invention without departing from those principles. It is not desired to limit the inventions to the particular illustrated embodiments shown and, accordingly, all suitable modifications and equivalents may resorted to falling within the scope of the inventions as defined by the claims which follow.

The methods and embodiments of the invention in which an exclusive property or previledge is claimed, are as follow:

1. An apparatus for measuring mass flow rate comprising in combination:
   (a) a pair of conduits, each conduit connected to a first port leg at first extremities of the pair of conduits and to a third conduit at second extremities of the pair of conduits opposite to said first extremities, said third conduit connected to a second port leg, wherein at least one of the pair of conduits has one extremity disposed in an arrangement restraining lateral deflection thereof and the other extremity disposed in a laterally deflective arrangement, and the third conduit has one extremity disposed in an arrangement restraining lateral deflection thereof and the other extremity disposed in a laterally deflective arrangement;
   (b) means for imposing flexural vibrations on said at least one of the pair of conduits and the third conduit;
   (c) first means for determining time rate of loss of momentum with the flexural vibration of said at least one of the pair of conduits; and
   (d) second means for determining time rate of loss of momentum associated with the flexural vibration of the third conduit;

wherein mass flow rate of media moving through the apparatus is determined from the difference in the time rates of loss of momentums respectively determined by said first and second means for determining time rate of loss of momentum.

2. A combination as set forth in claim 1 wherein said means for imposing flexural vibrations intermittently induces flexural vibrations of said at least one of the pair of conduits and the third conduit, and said first and second means for determining time rate of loss of momentum respectively measure attenuations of the flexural vibrations of said at least one of the pair of conduits and the third conduit.

3. A combination as set forth in claim 1 wherein said means for imposing flexural vibrations continuously induces flexural vibrations of said at least one of the pair of conduits and the third conduit with an energy input rate of known amount, and said first and second means for determining time rate of loss of momentum respectively measure levels of momentum of the flexural vibrations of said at least one of the pair of conduits and the third conduit.

4. A combination as set forth in claim 1 wherein said pair of conduits have identical flexural vibration characteristics.

5. A combination as set forth in claim 4 wherein said means for imposing flexural vibrations intermittently induces flexural vibrations of said at least one of the pair of conduits and the third conduit, and said first and second means for determining time rate of loss of momentum respectively measure attenuations of the flexural vibrations of said at least one of the pair of conduit and the third conduit.

6. A combination as set forth in claim 4 wherein said means for imposing flexural vibrations continuously induces flexural vibrations of said at least one of the pair of conduits and the third conduit with an energy input rate of known amount, and said first and second means for determining time rate of loss of momentum respectively measure levels of momentum of the flexural vibrations of said at least one of the pair of conduits and the third conduit.

7. A combination as set forth in claim 1 wherein said pair of conduits and said third conduit have identical flexural vibration characteristics.

8. A combination as set forth in claim 7 wherein said means for imposing flexural vibrations intermittently induces flexural vibrations of said at least one of the pair of conduits and the third conduit, and said first and second means for determining time rate of loss of momentum respectively measure attenuations of the flexural vibrations of said at least one of the pair of conduits and the third conduit.

9. A combination as set forth in claim 7 wherein said means for imposing flexural vibrations continuously induces flexural vibrations of said at least one of the pair of conduits and the third conduit with an energy input rate of known amount, and said first and second means for determining time rate of loss of momentum respectively measure levels of momentum of the flexural vibrations of said at least one of the pair of conduits and the third conduit.

10. An apparatus for measuring mass flow rate comprising in combination:
  (a) a pair of conduits, each conduit connected to a first port leg at first extremities of the pair of conduits in an arrangement restraining lateral deflection thereof and to a conduit section at second extremities of the pair of conduits in a laterally deflective arrangment;
  (b) a third conduit connected to said conduit section at one extremity of the third conduit in an arrangement restraining lateral deflection thereof and to a second port leg at the other extremity of the third conduit in a laterally deflective arrangement;
  (c) means for imposing flexural vibrations on at least one of the pair of conduits and the third conduit;
  (d) first means for determining time rate of loss of momentum associated with the flexural vibration of said at least one of the pair of conduits; and
  (e) second means for determining time rate of loss of momentum associated with the flexural vibration of the third conduit;
wherein mass flow rate of media moving through the apparatus is determined from the difference in the time rates of loss of momentums respectively determined by said first and second means for determining time rate of loss of momentum.

11. A combination as set forth in claim 10 wherein said means for imposing flexural vibrations intermittently induces flexural vibrations of said at least one of the pair of conduits and the third conduit, and said first and second means for determining time rate of loss of momentum respectively measure attenuations of the flexural vibrations of said at least one of the pair of conduits and the third conduit.

12. A combination as set forth in claim 10 wherein said means for imposing flexural vibrations continuously induces flexural vibrations of said at least one of the pair of conduits and the third conduit with an energy input rate of known amount, and said first and second means for determining time rate of loss of momentum respectively measure levels of momentum of the flexural vibrations of said at least one of the pair of conduits and the third conduit.

13. A combination as set forth in claim 10 wherein said pair of conduits have identical flexural vibration characteristics.

14. A combination as set forth in claim 13 wherein said means for imposing flexural vibrations intermittently induces flexural vibrations of said at least one of the pair of conduits and the third conduit, and said first and second means for determining time rate of loss of momentum respectively measure attenuations of the flexural vibrations of said at least one of the pair of conduits and the third conduit.

15. A combination as set forth in claim 13 wherein said means for imposing flexural vibrations continuously induces flexural vibrations of said at least one of the pair of conduits and the third conduit with an energy input rate of known amount, and said first and second means for determining time rate of loss of momentum respectively measure levels of momentum of the flexural vibrations of said at least one of the pair of conduits and the third conduit.

16. A combination as set forth in claim 10 wherein said pair of conduits and said third conduit have identical flexural vibration characteristics.

17. A combination as set forth in claim 16 wherein said means for imposing flexural vibrations intermittently induces flexural vibrations of said at lest one of the pair of conduits and the third conduit, and said first and second means for determining time rate of loss of momentum respectively measure attenuations of the flexural vibrations of said at least one of the pair of conduits and the third conduit.

18. A combination as set forth in claim 16 wherein said means for imposing flexural vibrations continuously induces flexural vibrations of said at least one of the pair of conduits and the third conduit with an energy input rate of known amount, and said first and second means for determing time rate of loss of momentum respectively measure levels of momentum of the flexural vibrations of said at least one of the pair of conduits and the third conduit.

* * * * *